US011475444B2

(12) United States Patent
Diamond

(10) Patent No.: US 11,475,444 B2
(45) Date of Patent: Oct. 18, 2022

(54) SYSTEMS AND METHODS FOR ANONYMOUS CRYPTOCURRENCY TRANSACTIONS

(71) Applicant: CONSENSYS SOFTWARE INC., Brooklyn, NY (US)

(72) Inventor: Benjamin E. Diamond, New York, NY (US)

(73) Assignee: CONSENSYS SOFTWARE INC., Brooklyn, NY (US)

( * ) Notice: Subject to any disclaimer, the term of this patent is extended or adjusted under 35 U.S.C. 154(b) by 274 days.

(21) Appl. No.: 16/857,732

(22) Filed: Apr. 24, 2020

(65) Prior Publication Data

US 2020/0342452 A1 Oct. 29, 2020

Related U.S. Application Data

(60) Provisional application No. 62/847,153, filed on May 13, 2019, provisional application No. 62/838,512, filed on Apr. 25, 2019.

(51) Int. Cl.
*G06Q 20/38* (2012.01)
*H04L 9/32* (2006.01)
*G06Q 20/36* (2012.01)

(52) U.S. Cl.
CPC ....... *G06Q 20/383* (2013.01); *G06Q 20/3674* (2013.01); *G06Q 20/3678* (2013.01); *G06Q 20/38215* (2013.01); *H04L 9/3221* (2013.01)

(58) Field of Classification Search
CPC ............ G06Q 20/383; G06Q 20/3674; G06Q 20/3678; G06Q 20/38215; G06Q 20/02;

(Continued)

(56) References Cited

U.S. PATENT DOCUMENTS 9,875,552 B1\* 1/2018 Savage ................... G06T 7/246
2019/0164153 A1\* 5/2019 Agrawal ............ G06Q 20/0658

OTHER PUBLICATIONS

One-out-of-Many Proofs: Or How to Leak a Secret and Spend a Coin, Jens Groth and Markulf Kohlweiss, (FP/2007-2013) / ERC Grant Agreement n. 307937. (Year: 2013).\*

(Continued)

*Primary Examiner* — Patrick McAtee
*Assistant Examiner* — Vincent I Idiake
(74) *Attorney, Agent, or Firm* — Grant J. Steyer

(57) ABSTRACT

Systems and methods for anonymous cryptocurrency transactions are disclosed. A method may include: receiving, from the electronic device associated with a sender of a cryptocurrency transaction, a zero-knowledge statement comprising a shuffled and anonymized list of participants comprising the sender, a receiver of the cryptocurrency transaction, and a plurality of decoy participants, a transfer amount, and a remaining balance, and a secret witness, wherein each participant is associated with an index; generating one-out-of-many proofs for the sender and the receiver based on their associated indices; generating a Basic Zether proof for the transfer amount and the remaining balance; conducting many-out-of-many proofs with parameters chosen for an anonymous payment setting; and constructing a zero-knowledge proof for the zero-knowledge statement. The sender sends an ordered list of the participants and the zero-knowledge proof to a verifier using the FiatShamir transform, and the verifier verifies the zero-knowledge proof.

14 Claims, 2 Drawing Sheets

(58) Field of Classification Search
CPC . G06Q 20/065; H04L 9/3221; H04L 2209/38; H04L 2209/56; H04L 9/3239
See application file for complete search history.

(56) References Cited

OTHER PUBLICATIONS

Bulletproofs: Short Proofs for Confidential Transactions and More—Benedikt Bunz Jonathan Bootle, Dan Boneh, Andrew Poelstra, Pieter Wuille, and Greg Maxwell—2018 IEEE Symposium on Security and Privacy. (Year: 2018).*

Many-out-of-Many Proofs and applications to Anonymous Zether—Benjamin E. Diamond—Apr. 25, 2019 (Year: 2019).*

* cited by examiner

SYSTEMS AND METHODS FOR ANONYMOUS CRYPTOCURRENCY TRANSACTIONS

RELATED APPLICATIONS

The disclosures of U.S. Provisional Patent Application Ser. No. 62/838,512, filed Apr. 25, 2019, and 62/847,153, filed May 13, 2019, are hereby incorporated, by reference, in their entireties.

BACKGROUND OF THE INVENTION

1. Field of the Invention

Embodiments are generally directed to systems and methods for anonymous cryptocurrency transactions.

2. Description of the Related Art

Typical cryptocurrencies (e.g., Bitcoin, Ethereum, etc.) do not preserve their users' privacy. Many initiatives have attempted to create secure blockchain-based payment systems which hide users' holdings and payment amounts, and even their identities.

The "Zether" protocol, proposed in Bünz et al., "Zether: Towards privacy in a smart contract world," Cryptology ePrint Archive, Report 2019/191 (2019), the disclosure of which is hereby incorporated by reference in its entirety, introduces a number of innovations into this space, most notably an account-based approach to private payment in which users' balances are encrypted as ElGamal ciphertexts. Cryptographically, Zether employs a combination of Bulletproofs and $\Sigma$ protocols which its authors call "$\Sigma$-Bullets".

The system described in the Zether manuscript, however, conceals only account balances and payment amounts, and not the identities of its transactors. A fully anonymous version is sketched in an appendix to the Bünz paper; unfortunately, only a relation (i.e., a Boolean-valued function on statement-witness pairs) is provided, together with the suggestion that "one-out-of-many proofs" be used. No cryptographic protocol is given.

SUMMARY OF THE INVENTION

Systems and methods for anonymous cryptocurrency transactions are disclosed. According to one embodiment, in a prover information processing apparatus comprising at least one computer processor, a method for anonymous cryptocurrency transactions may include: (1) receiving, from the electronic device associated with a sender of a cryptocurrency transaction, a zero-knowledge statement comprising a shuffled and anonymized list of participants comprising the sender, a receiver of the cryptocurrency transaction, and a plurality of decoy participants, a transfer amount, and a remaining balance, and a secret witness, wherein each participant is associated with an index; (2) generating one-out-of-many proofs for the sender and the receiver based on their associated indices; (3) generating a Basic Zether proof for the transfer amount and the remaining balance; (4) conducting many-out-of-many proofs with parameters chosen for an anonymous payment setting; and (5) constructing a zero-knowledge proof for the zero-knowledge statement. The sender sends an ordered list of the participants and the zero-knowledge proof to a verifier using the FiatShamir transform, and the verifier verifies the zero-knowledge proof.

In one embodiment, there may be an even number of participants.

In one embodiment, the index associated with the sender and the index associated with the receiver have opposite parity.

In one embodiment, the secret witness may include a private key for the sender and the indices associated with the sender and receiver.

In one embodiment, the step of generating one-out-of-many proofs for the sender and the receiver based on their indices may include: constructing a plurality of polynomials based on the number of participants; and transmitting evaluations of the polynomials to the verifier at a challenge point selected by the verifier. Evaluations may be verified using the techniques of "one-out-of-many" proofs.

In one embodiment, the step of generating a Basic Zether proof for the transfer amount and the remaining balance may include: expressing the transfer amount and the remaining balance as further commitments; sending the commitments to the verifier; conducting the Bulletproofs protocol; and conducting $\Sigma$-protocols which prove knowledge of the spender's secret key.

In one embodiment, the step of conducting many-out-of-many proofs with parameters chosen for an anonymous payment setting may include: assembling two vectors of evaluations a first two rows of a matrix; constructing a remainder of the matrix by applying a plurality of successive two-step rotations to the first two rows; multiplying the first vector of commitments by the matrix using an elliptic-curve variant of the number-theoretic transform; and verifying the transaction based on the transformed commitments.

In one embodiment, the step of constructing a zero-knowledge proof for the zero-knowledge statement may include: conducting a Bulletproofs range proof protocol; constructing correction terms for a many-out-of-many matrix product; constructing correction terms for one-out-of-many-based re-encryptions of the sender's remaining account balance ciphertext, an adjustment ciphertext for the sender, and a public key for the sender; and verifying $\Sigma$-Bullets on the re-encryptions.

In one embodiment, the verifier may compute evaluations; verify that the evaluations satisfy the one-out-of-many proofs; verify that the index associated with the sender and the index associated with the receiver have opposite parities; compute re-encryptions; construct many-out-of-many re-encryptions; execute $\Sigma$-Bullets verification on the re-encryptions; and perform inner product verification.

According to another embodiment, a system for anonymous cryptocurrency transactions may include a network comprising a sender of a cryptocurrency transaction, a receiver of the cryptocurrency transaction, and a plurality of decoy participants, the sender associated with an electronic device executing an anonymity prover; an electronic device associated with the sender; and an anonymity verifier executed by an electronic device comprising at least one computer processor. The anonymity prover may receive, from the electronic device associated with the sender, a zero-knowledge statement comprising a shuffled list of participants comprising the sender, a receiver, and a plurality of the decoy participants, a transfer amount, and a remaining balance, and a secret witness, wherein the sender and receiver are associated with indices; generate one-out-of-many proofs for the sender and the receiver based on their associated indices; generate a Basic Zether proof for the transfer amount and the remaining balance; conduct many-out-of-many proofs with parameters chosen for an anonymous payment setting; and construct a zero-knowledge proof for the zero-knowledge statement. The sender electronic device sends an ordered list of the participants and the zero-knowledge proof to the verifier using the Fiat-Shamir transform. The verifier verifies the zero-knowledge proof.

In one embodiment, there may be an even number of participants.

In one embodiment, the index associated with the sender and the index associated with the receiver have opposite parity.

In one embodiment, the secret witness may include a private key for the sender and the indices associated with the sender and receiver.

In one embodiment, the anonymity prover may generate the one-out-of-many proofs by: constructing a plurality of polynomials based on the number of participants; and transmitting evaluations of the polynomials to the verifier at a challenge point selected by the verifier. The evaluations may be verified with the outputs of the Basic Zether proof.

In one embodiment, wherein the anonymity prover may generate the Basic Zether proof by: expressing the transfer amount and the remaining balance as further commitments; sending the commitments to the verifier; conducting the Bulletproofs protocol; and conducting $\Sigma$-protocols which prove knowledge of the spender's secret key.

In one embodiment, the anonymity prover may conduct the many-out-of-many proofs with parameters chosen for an anonymous payment setting by: assembling two vectors of evaluations into a first two rows of a matrix; constructing a remainder of the matrix by applying a plurality of successive two-step rotations to the first two rows; multiplying the first vector of commitments by the matrix using an elliptic-curve variant of the number-theoretic transform; and verifying the transaction based on the transformed commitments.

In one embodiment, the anonymity prover may construct the zero-knowledge proof for the zero-knowledge statement by: conducting a Bulletproofs range proof protocol; constructing correction terms for a many-out-of-many matrix product; constructing correction terms for one-out-of-many-based re-encryptions of the sender's remaining account balance ciphertext, an adjustment ciphertext for the sender, and a public key for the sender; and verifying $\Sigma$-Bullets on the re-encryptions.

In one embodiment, the verifier may verify the zero-knowledge proof by: computing evaluations; verifying that the evaluations satisfy the one-out-of-many proofs; verifying that the index associated with the sender and the index associated with the receiver have opposite parities; computing re-encryptions; conducting many-out-of-many re-encryptions; executing $\Sigma$-Bullets verification on the re-encryptions; and performing inner product verification.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
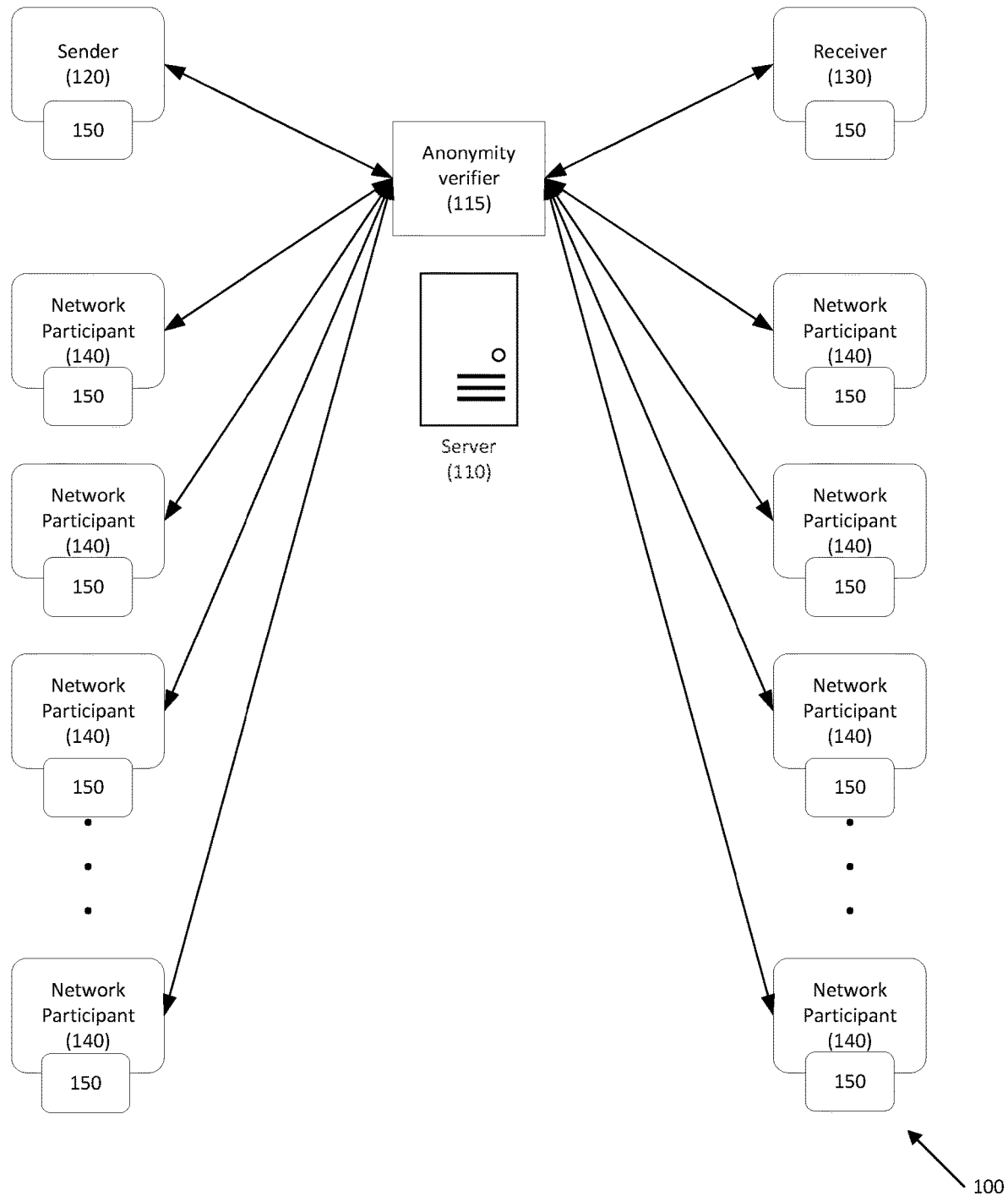
FIG. 1 depicts a system for anonymous cryptocurrency transactions according to one embodiment.

Embodiments are directed to systems and methods for anonymous cryptocurrency transactions. In one embodiment, a cryptographic protocol extends Zether so that it supports anonymity (i.e., concealing the sender and receiver of each transfer of funds). Like basic Zether, it provides confidentiality as well (e.g., account balances and transfer amounts are concealed).

In embodiments, a verifier may permute and reuse a certain vector constructed within "one-out-of-many" proofs, so as to yield all of the elements of a known list in an order that is known to the prover, but not to the verifier. This may be similar to a "shuffle proof," but with differences. First, shuffle proofs require a homomorphic commitment scheme, such as ElGamal ciphertexts encrypted under the same public key; in embodiments, ciphertexts may be encrypted under arbitrary public keys. Second, the entire permutation need not be selected by the prover, but rather only "the images of 0 and 1." What this means is that the verifier only need distinguish between the sender's ciphertext, the receiver's ciphertext, and everyone else's. Thus only "part of" the permutation must be transmitted.

Embodiments may use the techniques of one-out-of-many proofs to provide re-encryptions of the sender's and receiver's ciphertexts to the verifier, while concealing these ciphertexts' indices. Each execution of one-out-of-many proofs conceals a secret index with recourse to a certain vector of field elements. These field elements are themselves evaluations, such as at a challenge point chosen by the verifier, of certain polynomials constructed by the prover, whose degrees moreover reflect the secret index. In particular, the polynomial residing at the secret index has a higher degree than the polynomials at the other indices.

Using standard one-out-of-many proofs (that is, sending such a vector of evaluations) for each among the N ciphertexts would require communication at least quasilinear in N. Alternatively, the verifier may permute and reuse the original two vectors sent to her in order to recover the remaining N−2 ciphertexts.

In one embodiment, N may be an even number, and circular shifts of step size 2 may be applied to each of the field-element vectors. These rotations exactly exhaust the indices of the original list just in the case that the original secret indices featured opposite parities; this latter condition too can be proven using a system we describe in the invention.

Thus, in one embodiment, the prover need only transmit 2 vectors of evaluations, instead of N. This reduces the proof size by a factor of N.

In one embodiment, the secret indices may have opposite parities, with the location of the high-degree polynomial being in an odd index (e.g., position 3) in the first vector, and the location of the high-degree polynomial in the other vector being in an even i (e.g., position 6), or vice-versa.

Embodiments may provide some or all of the following: (1) a formal proof of security (i.e., soundness and zero-knowledge properties); (2) performance: logarithmically-sized proofs and linear prover/verifier time; and (3) applications: applications may be built for this protocol.

Exemplary applications may include: token issuance, token transfer, token exchange, payments, cryptocurrency, etc.

Referring to FIG. 1, a system for anonymous cryptocurrency transactions are disclosed. System 100 may include server 110 that may execute anonymity verifier 115, sender 120, receiver 130, network participants 140, etc.

Each participant (e.g., sender 120, receiver 130, and network participants 140) may have access to a running instance of anonymity prover 150, that may be invoked at any time to generate zero-knowledge proofs as per the protocol. In one embodiment, the instance of anonymity prover 150 may be personal and may be run locally on, for example, an electronic device accessed by the participant. In one embodiment, anonymity prover 150 may be a computer program or application that is executed on each participant's electronic device, which moreover contains the secret key belonging to its respective user. This secret key is necessary for it to generate proofs on its user's behalf.

Once generated, the proofs are then sent to anonymity verifier 115 for verification.

In one embodiment, each of sender 120, receiver 130, and network participants 140 may be part of a distributed ledger network (not shown).

The anonymity provers 150 and verifier 115 may be computer programs or applications that may execute, for example, a zero-knowledge proof protocol described below that facilitates the anonymity of participants to a transaction, such as sender 120 and receiver 130.

In one embodiment, anonymity verifier 115 may be a smart contract running on a distributed ledger, so that each participant in the network, and even outside observers of the network, may independently verify the validity of proofs submitted by network participants to verifier 115.

Figure 2:
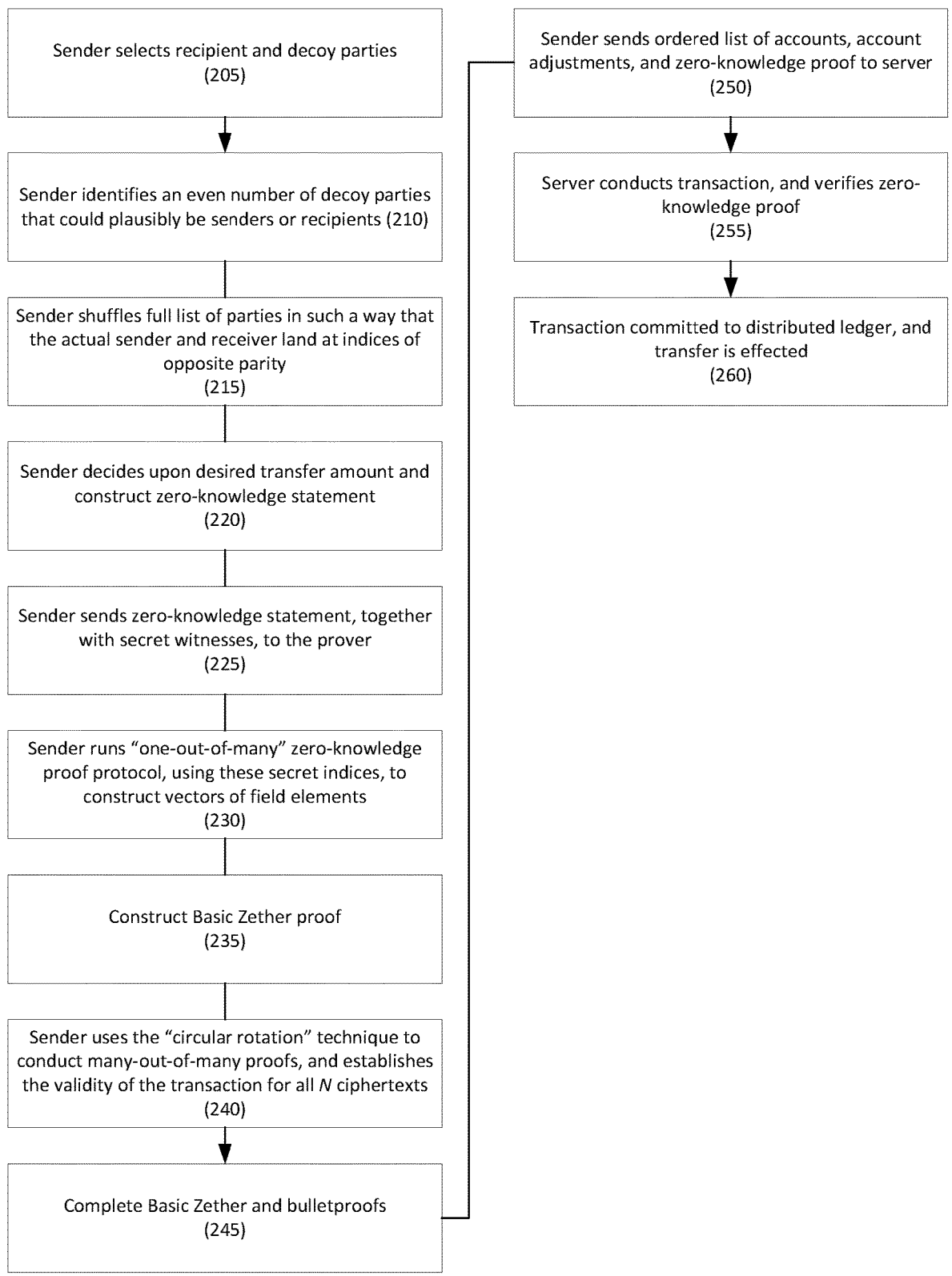
FIG. 2 depicts a method for anonymous cryptocurrency transactions to one embodiment.

Referring to FIG. 2, a method for anonymous cryptocurrency transactions is disclosed according to one embodiment.

In step 205, a first party may identify a second party to a transaction. For example, the first party may be a sender (e.g., a payor) and the second party may be a receiver (e.g., the payee). Other types of participants to a transaction and transaction types may be included as is necessary and/or desired.

In one embodiment, the sender may determine the public key for the second party. This may be done by communicating with the second party using a prior, authenticated channel.

In step 210, the sender may identify a number of other network participants as "decoy" parties that could be senders or receivers. In one embodiment, the total number of parties, including both the actual sender and receiver and the decoys, may be a power of two. For example, the sender defines N as the size of this list, and sets m:=$\log_2(N)$.

In step 215, the sender may locally shuffle the entire list of participants (including the decoys). For example, if there are two parties (e.g., the sender, the receiver, and six decoys), the sender and the receiver may be assigned indices (e.g., 3 and 6). In one embodiment, the indices (e.g., $l_0$ and $l_1$) assigned to the sender and receiver of the transaction may be selected to have the opposite parity (i.e., one is odd and one is even). (Because N is a power of 2, and in particular is even, parity of integers modulo N is well-defined.) Let the full shuffled list be given by the public keys $(y_i)_{i=0}^{N-1}$.

In step 220, the sender may decide upon a desired transfer amount and construct a zero-knowledge statement. For example, having decided upon an amount of funds to transfer (e.g., b*), assumed to be an unsigned 32-bit integer, the sender encrypts under the respective keys $y_i$ the amounts by which it intends each balance to change, using randomness-reusing El Gamal encryption. That is, for some secret random scalar r, the sender sets D:=$g^r$ (where g is a fixed, public generator) and then sets $C_{l_0}:=g^{-b^*}y_{l_0}^r$ and $C_{l_1}:=g^{-b^*}y_{l_1}^r$, and finally $C_i:=y_i^r$ for each i∈{0, . . . , N−1}\{$l_0$, $l_1$}.

The prover may anticipate, for each $y_i$, the effect of adding the ciphertext ($C_i$, D) to $y_i$'s standing account balance. In this way, the prover may construct a further array of "post-deduction" ciphertexts; call them $(C_{Ln,i}, C_{Rn,i})_{i=0}^{N-1}$. In particular, the element $(C_{Ln,l_0}, C_{Rn,l_0})$ represents the sender $y_{l_0}$'s account post-deduction. Assuming that the prover is honest, the balance of this account will be a further unsigned 32-bit integer; call it b'.

In step 225, the sender may send a zero-knowledge statement, together with secret witnesses, to the prover. For example, the sender may pass the shuffled list $(y_i)_{i=0}^{N-1}$ and the lists of ciphertexts $(C_i, D)_{i=0}^{N-1}$ and $(C_{Ln,i}, C_{Rn,i})_{i=0}^{N-1}$, to the prover, together with its private key, the secret indices $l_0$ and $l_1$, the desired transfer amount b*, and the remaining balance b'. The $l_0$ and $l_1$, the desired transfer amount b*, and the remaining balance b' may be considered to be the secret witness.

In one embodiment, the sender and the prover may be the same entity, as the prover may reside on the sender's electronic device, and may have access to the sender's secret data.

In step 230, the prover may generate one-out-of-many proofs for the sender and the receiver based on their indices. The one-out-of-many proof technique allows a prover to select a secret ciphertext from a public list of ciphertexts, to "scramble" it so that it becomes externally unrecognizable (while its plaintext remains the same), and then to hand the scrambled ciphertext to the verifier. The technique proves to the verifier that the scrambled ciphertext nonetheless represents one of the original list's ciphertexts, with message intact. The particular element among the original list's ciphertexts that the scrambled ciphertext represents, however, remains secret.

An example of a one-out-of-many proofs is disclosed in Groth and Kohlweiss, "One-out-of-Many Proofs: Or How to Leak a Secret and Spend a Coin" EUROCRYPT (2): 253-280 (2015), the disclosure is hereby incorporated, by reference, in its entirety. For example, a key step in the process disclosed by Groth is the construction by the prover of certain polynomials $P_i(X)$, i∈{0, . . . , N−1}, where N is the size of the original list. Though these polynomials' degrees range from 0 to in, where m:=$\log_2(N)$, the key property is that one, and only one, among these polynomials attains the maximal degree m–namely, $P_l(X)$, where l is the secret index known only the prover.

In one embodiment, having constructed these polynomials, the prover transmits to the verifier its evaluations, $p_i:=P_i(x)$, for i∈{0, . . . , N−1}, at a challenge point x chosen by the verifier. Using optimizations described by Groth and Kohlweiss, this can be done with only logarithmic communication. Finally, by using the elements $p_i$ as the exponents in a multi-exponentiation, the verifier may "lift" out the $l^{th}$ ciphertext in the original list, while learning nothing about the index l.

For example, if N=8 and the sender is assigned index 3, the vector of polynomials constructed by the power for the first party would feature a high-degree polynomial only at the index 3. If the receiver is assigned index 6, the vector of polynomials corresponding to the receiver's ciphertext would feature a high-degree component only at the index 6. Note that these are exemplary only.

The indexes may start with 0 and go to N−1. Other indexing schemes or conventions may be used as is necessary and/or desired.

For example, the prover expresses $l_0$ and $l_1$ in binary form, and in particular derives bits $b_{l,k}$∈{0, 1}, for l∈{0, 1} (corresponding to the two numbers $l_0$ and $l_1$) and k∈{0, . . . , m−1} (in bits per number) and may commit to these bits (2·m in total) in a Pedersen vector commitment B.

Next, the prover also generates random field elements $\{a_{l,k}\}_{l,k=0}^{1,m-1}$, also and finally linear polynomials $\{F_{l,k}(X):=b_{l,k}\cdot X+a_{l,k}\}_{l,k=0}^{1,m-1}$.

The prover also generates a commitment A to the values $\{a_{l,k}\}_{l,k=0}^{1,m-1}$, and furthermore commitments C and D to the $1^{st}$- and $0^{th}$-order coefficients (respectively) of the products $\{F_{l,k}(X)\cdot(X-F_{l,k})\}_{l,k=0}^{1,m-1}$. (Because the $1^{st}$-order coefficients $b_{l,k}$ of $F_{l,k}(X)$ reside in $\{0, 1\}$, these products will also be linear.)

Finally, the prover also generates commitments E and F to the $1^{st}$- and $0^{th}$-order coefficients of the polynomial products $F_{0,0}(X)\cdot F_{1,0}(X)$ and $(X-F_{0,0}(X))\cdot(X-F_{1,0}(X))$. These products themselves are linear if and only if the least-significant bits $b_{0,0}$ and $b_{1,0}$ are opposite. That is, their linearity encodes exactly the fact that $l_0$ and $l_1$ have opposite parities.

In step 235, a Basic Zether proof may be generated. In one embodiment, the prover may express the transfer amount b*, and the remaining balance b' (each of which is assumed to be an unsigned 32-bit integer) in binary, and commits to their bits (64 in total) in a commitment BA, as well as to 64 random scalars in a second commitment BS.

In one embodiment, the prover sends commitments A, B, C, D, E, F, BA, and BS to the verifier. The verifier responds with a random challenge v. In one embodiment, the prover may hash these quantities, along with the statement, to construct v, as prescribed by the standard Fiat-Shamir transform.

As a continuation of step 230, the prover writes $F_{l,k,1}(X):=F_{l,k}(X)$ and $F_{l,k,0}(X):=X-F_{l,k,1}(X)$, for each for $l\in\{0, 1\}$ and $k\in\{0, \ldots, m-1\}$, and then constructs, for each $l\in\{0, 1\}$, the products $\{P_{l,i}(X):=\sum_{k=0}^{m}P_{l,i,k}\cdot X^k:=\prod_{k=0}^{m-1}F_{l,k,i_k}(X)\}_{i=0}^{N-1}$, where $i_k$ denotes the $k^{th}$ (little-endian) bit of i.

In step 240, the sender may conduct many-out-of-many proofs, with parameters chosen for the anonymous payment setting. For example, the prover anticipates the computation by the verifier of $\prod_{i=0}^{N-1}(C_{Ln,i}, C_{Rn,i})^{p_{0,i}}, \prod_{i=0}^{N-1}C_i^{p_{0,i}}$, and $\prod_{i=0}^{N-1}y_i^{p_{0,i}}$, where $\{p_{l,i}:=P_{l,i}(x)\}_{l,i=0}^{1,N-1}$ are the evaluations of $P_{l,i}(X)$ at an as-yet-unknown challenge x, to be chosen by the verifier. To this end, the prover computes, for each $k\in\{0, \ldots, m-1\}$, the $k^{th}$-order parts:

$$(\widetilde{C_{Ln,k}}, \widetilde{C_{Rn,k}}) := \left(\left(\prod_{i=0}^{N-1}C_{Ln,i}^{P_{0,i,k}}\right)\cdot y_{l_0}^{\phi_k}, \left(\prod_{i=0}^{N-1}c_{Rn,i}^{P_{0,i,k}}\right)\cdot g^{\phi_k}\right)$$

$$(\widetilde{C_{0,k}}, \widetilde{D_k}) := \left(\left(\prod_{i=0}^{N-1}C_i^{P_{0,i,k}}\right)\cdot y_{l_0}^{\chi_k}, g^{\chi_k}\right)$$

$$(\widetilde{y_{0,k}}, \widetilde{g_k}) := \left(\left(\prod_{i=0}^{N-1}C_i^{P_{0,i,k}}\right)\cdot y_{l_0}^{\psi_k}, g^{\psi_k}\right)$$

Where $\{\phi_k, \chi_k, \psi_k\}_{k=0}^{m-1}$ are random blinding scalars chosen by the prover.

The prover initiates the key many-out-of-many process. The prover assembles the length-N vector $\xi:=[1, 1, v, v^2 \ldots, v^{N-2}]$. The prover computes the further $k^{th}$-order parts:

$$(\widetilde{C_{X,k}}, \widetilde{y_{X,k}}) := \left(\prod_{i,j=0}^{1,\frac{N}{2}-1}\left(g^{b^*\cdot(-P_{t,l_0}-2j,k+P_{t,l_1}-2j,k)}\right)^{\xi_{2j+t}}\cdot D^{\omega_k}, g^{\omega_k}\right)$$

The essential explanation behind this step is as follows. The prover anticipates that the verifier will assemble the N×N matrix whose top two rows are given by $\{p_{0,i}\}_{i=0}^{N-1}$ and $\{p_{1,i}\}_{i=0}^{N-1}$, and whose subsequent $$\frac{N}{2}-1$$

pairs of rows are each attained by shifting both rows of the prior pair together two steps to the right. This matrix will be referred to as P. The verifier will also independently construct $\xi$. The prover anticipates that the verifier will multiply the initial vector $(C_i, Y_i)_{i=0}^{N-1}$ by P, and then multiply the result in turn by $\xi$. Each $(\widetilde{C_{X,k}}, \widetilde{y_{X,k}})$ above, for $k\in\{0, \ldots, m-1\}$, represents exactly the $k^{th}$-order part of this final product, and in particular the contribution to it of the (only) nonzero messages $g^{-b^*}$ and $g^{b^*}$. That the prover is able to anticipate and eliminate these $k^{th}$-order parts proves that $(C_{l_0}, D)$ and $(C_{l_1}, D)$ encrypt opposite messages (whatever $l_0$ and $l_1$ happen to be), and simultaneously that $(C_i, D)$ for $i\in\{l_0, l_1\}$ encrypts 0. This is exactly the pattern required for soundness of an Anonymous Zether transaction.

The prover then may send $(\widetilde{C_{Ln,k}}, \widetilde{C_{Rn,k}}, \widetilde{C_{0,k}}, \widetilde{D_k}, \widetilde{y_{0,k}}, \widetilde{g_k}, \widetilde{C_{X,k}}, \widetilde{y_{X,k}})_{k=0}^{m-1}$ to the verifier, and may receive x in response.

In step 245, the sender may use the prover to construct a zero-knowledge proof. This proof may include, for example, data that may facilitate the verifier's reconstruction of the initial two row vectors, and may include assertions that the polynomials evaluated in these vectors achieve high degree only at only one index per vector, and that the two vectors' respective indices have opposite parity.

The proof "convinces" the verifier that certain things are true (e.g., that the indices have opposite parity) but without revealing further information (e.g., what the indices are). In other words, these "assertions" are tacit (cryptographic), and not explicit.

The prover may evaluate $f_{l,k}:=F_{l,k}(x)$ for each $k\in\{0, \ldots, m-1\}$, and sends $\{f_{l,k}\}_{l,k=0}^{1,m-1}$ to the verifier, along with the randomnesses $z_A, z_C$ and $z_E$, and may receive Bulletproofs challenges y and z in response. The prover may evaluate $T_1$ and $T_2$ and sends them to the verifier, and may receive a further challenge in response.

The prover may compute $\hat{t}$ and $\mu$ as in Bulletproofs. After sampling random scalars $k_{sk}, k_r, k_b, k_\tau$, the prover sets $A_D, A_t,$ and $A_u$, and sets $A_y := \overline{g}^{k_{sk}}$, $$A_b := g^{k_b}\left(\overline{D}^{-z^2}\cdot\overline{C_{Rn,}}^{z^3}\right)^{k_{sk}},$$

where $$\overline{C_{Rn}} := (C_{Rn,i_0})^{x^m}\cdot\prod_{k=0}^{m-1}g^{-\phi_k\cdot x^k}.$$

and $$\overline{D} := D^{w^m}\cdot g^{-\sum_{k=0}^{m-1}\chi_k\cdot x^k}\quad \overline{g} := g^{x^m-\sum_{k=0}^{m-1}\chi_k\cdot x^k},$$

These are as in Σ-Bullets, but with certain terms replaced by their re-encrypted versions, which the verifier will ultimately compute (the prover can anticipate these terms' values). Note also the negative sign in front of $z^2$, which reflects the fact that $(C_{l_0}, D)$ encrypts a negative number. The prover also sets $A_X := \overline{y_X}^{-k_r}$, where $$\overline{y_X} := \prod_{i,j=0}^{1,\frac{N}{2}-1} \left( \prod_{i=0}^{N-1} y_i^{p_{l,i-2j}} \right)^{\xi_{2j+\iota}}.$$

This is a replacement of the term $A_{\overline{y}}$ of $\Sigma$-Bullets, vastly generalized in this setting.

The prover may send $t$, $\mu$, $A_D$, $A_t$, $A_u$, $A_y$, $A_b$, $A_X$ to the verifier, and receives the final challenge $c$.

The prover may set $s_{sk} := k_{sk} + c \cdot sk$, where sk is the sender's secret key. The prover sets $s_r := k_r + c \cdot r$, $s_b := k_b + c \cdot x^m \cdot (b^* \cdot z^2 + b' \cdot z^3)$, and $s_\tau := k_\tau + c \cdot x^m \cdot \tau$. This is analogous to $\Sigma$-Bullets, except with the addition of certain $x^m$ factors, whose necessity will become evident below.

The prover may send $s_{sk}$, $s_r$, $s_b$, $s_\tau$ to the verifier. This completes the proving process.

In step 250, the sender may send the ordered list of accounts to the server, or verifier. The sender may also include the zero-knowledge proof. With the aid of the Fiat-Shamir heuristic, the entire proving process can be made interactive. The sender may assemble the entire non-interactive proof thus constructed, together with the initial statement $(y_i)_{i=0}^{N-1}$, $(C_i, D)_{i=0}^{N-1}$ and $(C_{Ln,i}, C_{Rn,i})$ and serialize everything as per the Ethereum protocol. This data payload may then be broadcast to the blockchain network for verification.

In step 255, the server may verify the supplied zero-knowledge proof as per the protocol described in the invention, and may conduct the transaction between the two accounts.

In embodiments, the number-theoretic transform—an analogue of the Fast Fourier Transform for prime fields—may be extended to the case of elliptic curve points. Only a signal's domain's module structure—and not its ring structure—arises throughout its role in the number-theoretic transform. Interpreting an elliptic curve of prime order q as a module over the field of order q, the Fourier transform of a "signal" consisting of curve points may be computed.

Similarly, the circular convolution theorem—whereby a quadratic-time circular convolution in the time domain can be replaced by a linear-time Hadamard product in the frequency domain, together with a pair of linearithmic-time fast Fourier transforms and an inverse transform—may apply when the convolution takes place between a vector of curve points and an "exponent" of field elements.

In light of the nature of the circular rotation technique, the matrix by which the verifier multiplies the initial vector of ciphertexts is a circulant matrix, and the multiplication itself can be re-conceived as a discrete circular convolution, or as the interleaving of the even-indexed rows of two such matrices, and the desired result consists of the interleaving of two convolutions.

Embodiments thus use an elliptic-curve analogue of the number-theoretic transform to efficiently conduct this matrix multiplication.

The savings are attained not just in verification but also in proving, during which time the prover must compute 0th-order correction terms.

Upon receiving such a payload, the network may begin the verification process. To do this, the verifier may perform the following checks. The verifier first sets $f_{l,i,1} := f_{l,i}$ and $f_{l,i,0} := x - f_{l,i}$, and then computes the evaluations $p_{l,i} := \prod_{k=0}^{m-1} f_{l,k,i_k}$, for $l \in \{0,1\}$ and $k \in \{0, \ldots, m-1\}$. By construction of the $f_{l,i}$, these satisfy $p_{l,i} = P_{l,i}(x)$. The verifier may then check whether $B^x \cdot A$ and $C^x \cdot D$ satisfy the conditions of $B^x \cdot A = \text{Com}(f_{0,0}, \ldots, f_{1,m-1})$ and $C^x \cdot D = \text{Com}((f_{l,k} \cdot (x - f_{l,k}))_{l,k=0}^{1,m-1})$. The verifier may also require that $E^x \cdot F = \text{Com}(f_{0,0} \cdot f_{1,0}, (x - f_{0,0}) \cdot (x - f_{1,0}))$ (this completes the opposite parity check).

Next, the verifier may compute the re-encryptions, with corrections. The verifier sets, for each $k \in \{0, \ldots, m-1\}$:

$$(\widetilde{C_{Ln}}, \widetilde{C_{Rn}}) := \left( \left( \prod_{i=0}^{N-1} C_{Ln,i}^{p_{0,i}} \right) \cdot \prod_{k=0}^{m-1} \widetilde{C_{Ln,k}}^{-x^k}, \left( \prod_{i=0}^{N-1} C_{Rn,i}^{p_{0,i}} \right) \cdot \prod_{k=0}^{m-1} \widetilde{C_{Rn,k}}^{-x^k} \right)$$

$$(\widetilde{C_0}, \widetilde{D}) := \left( \left( \prod_{i=0}^{N-1} C_i^{p_{0,i}} \right) \cdot \prod_{k=0}^{m-1} \widetilde{C_{0,k}}^{-x^k}, D^{x^m} \cdot \prod_{k=0}^{m-1} \widetilde{D_k}^{-x^k} \right)$$

$$(\widetilde{y_0}, \overline{g}) := \left( \left( \prod_{i=0}^{N-1} y_i^{p_{0,i}} \right) \cdot \prod_{k=0}^{m-1} \widetilde{y_{0,k}}^{-x^k}, g^{x^m} \cdot \prod_{k=0}^{m-1} \widetilde{g_k}^{-x^k} \right)$$

The verifier may then construct the key many-out-of-many re-encryptions. That is, the verifier sets $\xi := [1, 1, v, v^2 \ldots, v^{N-1}]$ as above, and then, for $k \in \{0, \ldots, m-1\}$:

$$(\widetilde{C_X}, \widetilde{y_X}) := \left( \prod_{\iota,j=0}^{1,\frac{N}{2}-1} \left( \prod_{i=0}^{N-1} (C_i, y_i)^{p_{l,i-2j}} \right)^{\xi_{2j+\iota}} \cdot \prod_{k=0}^{m-1} (\widetilde{C_{X,k}}, \widetilde{y_{X,k}})^{-x^k} \right)$$

Next, the verifier proceeds with $\Sigma$-Bullets verification, but on the re-encrypted elements. That is, the verifier checks $A_D = g^{s_r} \cdot D^{-c}$ as well as $A_u$ as in $\Sigma$-Bullets. The verifier also checks $A_y = \overline{g}^{s_{sk}} \cdot \widetilde{y_0}^{-c}$ and $g^{-s_b} \cdot A_b = (\widetilde{D}^{-z^2} \cdot \widetilde{C_{Rn}}^{z^3})^{s_{sk}} \cdot (\widetilde{C_0}^{-z^2} \cdot \widetilde{C_{Ln}}^{z^3})^{-c}$; these are as in $\Sigma$-Bullets, but over re-encryptions. The verifier also checks $g^{x^m \cdot c \cdot \hat{t}} \cdot h^{s_\tau} = g^{x^m \cdot c \cdot \delta(y,z)} \cdot g^{s_b} \cdot A_t \cdot (T_{eval})^{x^m \cdot c}$, where $T_{eval}$ is in Bulletproofs. Finally, the verifier checks $A_X = \overline{Y_X}^{s_r} \cdot \widetilde{C_X}^{-c}$, the final many-out-of-many verification.

Next, the prover and the verifier perform the inner product verification, as in $\Sigma$-Bullets. This completes the verification process.

In step 260, the server may commit the transaction to the distributed ledger.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for anonymous cryptocurrency transactions, comprising:
    in a prover information processing apparatus comprising at least one computer processor:
    receiving, from the electronic device associated with a sender of a cryptocurrency transaction, a zero-knowledge statement comprising a shuffled and anonymized list of participants comprising the sender, a receiver of the cryptocurrency transaction, and a plurality of decoy participants, a transfer amount, and a remaining balance, and a secret witness, wherein each participant is associated with an index;
    generating one-out-of-many proofs for the sender and the receiver based on their associated indices;
    generating a Basic Zether proof for the transfer amount and the remaining balance;
    conducting many-out-of-many proofs with parameters chosen for an anonymous payment setting; and
    constructing a zero-knowledge proof for the zero-knowledge statement;
    wherein the sender sends an ordered list of the participants and the zero-knowledge proof to a verifier using the FiatShamir transform; and
    wherein the verifier verifies the zero-knowledge proof.

2. The method of claim 1, wherein there is an even number of participants.

3. The method of claim 1, wherein the index associated with the sender and the index associated with the receiver have opposite parity.

4. The method of claim 1, wherein the secret witness comprises a private key for the sender and the indices associated with the sender and receiver.

5. The method of claim 1, wherein the step of generating one-out-of-many proofs for the sender and the receiver based on their indices comprises:
    constructing a plurality of polynomials based on the number of participants; and
    transmitting evaluations of the polynomials to the verifier at a challenge point selected by the verifier;
    wherein evaluations are verified with the outputs of the Basic Zether proof.

6. The method of claim 1, wherein the step of generating a Basic Zether proof for the transfer amount and the remaining balance comprises:
    expressing the transfer amount and the remaining balance as further commitments;
    sending the commitments to the verifier;
    conducting a Bulletproofs protocol; and
    conducting $\Sigma$-protocols to prove knowledge of a secret key for the sender.

7. The method of claim 1, wherein the verifier:
    computes evaluations;
    verifies that the evaluations satisfy the one-out-of-many proofs;
    verifies that the index associated with the sender and the index associated with the receiver have opposite parities;
    computes re-encryptions;
    constructs many-out-of-many re-encryptions;
    executes $\Sigma$-Bullets verification on the re-encryptions; and
    performs inner product verification.

8. A system for anonymous cryptocurrency transactions, comprising:
    a network comprising a sender of a cryptocurrency transaction, a receiver of the cryptocurrency transaction, and a plurality of decoy participants, the sender associated with an electronic device executing an anonymity prover; and an electronic device associated with the sender; and an anonymity verifier executed by an electronic device comprising at least one computer processor:

wherein:

the anonymity prover receives, from the electronic device associated with the sender, a zero-knowledge statement comprising a shuffled list of participants comprising the sender, a receiver, and a plurality of the decoy participants, a transfer amount, and a remaining balance, and a secret witness, wherein the sender and receiver are associated with indices;

the anonymity prover verifier generates one-out-of-many proofs for the sender and the receiver based on their associated indices;

the anonymity prover generates a Basic Zether proof for the transfer amount and the remaining balance;

the anonymity prover conducts many-out-of-many proofs with parameters chosen for an anonymous payment setting;

the anonymity prover constructs a zero-knowledge proof for the zero-knowledge statement;

the sender electronic device sends an ordered list of the participants and the zero-knowledge proof to the verifier using the FiatShamir transform; and the verifier verifies the zero-knowledge proof.

9. The system of claim 8, wherein there is an even number of participants.

10. The system of claim 8, wherein the index associated with the sender and the index associated with the receiver have opposite parity.

11. The system of claim 8, wherein the secret witness comprises a private key for the sender and the indices associated with the sender and receiver.

12. The system of claim 8, the anonymity prover generates the one-out-of-many proofs by:

constructing a plurality of polynomials based on the number of participants; and transmitting evaluations of the polynomials to the verifier at a challenge point selected by the verifier;

wherein evaluations are verified with the outputs of the Basic Zether proof.

13. The system of claim 8, wherein the anonymity prover generates the Basic Zether proof by:

expressing the transfer amount and the remaining balance as further commitments;

sending the commitments to the verifier;

conducting a Bulletproofs protocol; and conducting $\Sigma$-protocols to prove knowledge of a secret key for the sender.

14. The system of claim 8, wherein the verifier verifies the zero-knowledge proof by:

computes evaluations;

verifies that the evaluations satisfy the one-out-of-many proofs;

verifies that the index associated with the sender and the index associated with the receiver have opposite parities;

computes re-encryptions;

constructs many-out-of-many re-encryptions;

executes $\Sigma$-Bullets verification on the re-encryptions; and performs inner product verification.

* * * * *